Patented Feb. 9, 1943

2,310,263

UNITED STATES PATENT OFFICE 2,310,263

METHOD OF MAKING DEXTRAN

Grant L. Stahly, Columbus, Ohio, assignor to The Commonwealth Engineering Company of Ohio, Dayton, Ohio, a corporation of Ohio No Drawing. Application March 20, 1940, Serial No. 325,049

1 Claim. (Cl. 195—31)

This invention relates to an improvement in the method of producing dextran, and particularly with regard to the production of dextran from sucrose by "dextran forming" bacteria.

In the making of dextran from sucrose with bacteria, it has been found that the presence of a certain catalytic substance is necessary in order to form dextran. The chemical constitution of this substance is not specifically known but appears to be related to the vitamin B-complex and is found in the water extract resulting from the treatment of charcoal residue used in the refining of sugar. This substance is referred to herein as the dextran synthesis factor.

It has been discovered that this dextran synthesis factor is present in certain raw sucrose products but not in the refined material; however, it has been discovered that by utilizing the waste charcoal such as bone and the like, employed in the refining of sugar, suitable amounts of the synthesis factor can be extracted by treating the charcoal with water, as with the use of a Soxhlet extraction apparatus conventionally used in the art.

It is an object of this invention to make use of this waste charcoal extract in the production of dextran from a culture comprising "dextran forming" bacteria, such as Leuconostoc mesenteroides or Leuconostoc dextranicum.

Another object of this invention is to provide an improved method of making dextran from sucrose by subjecting sucrose to the action of microorganisms including Leuconostoc bacteria on the culture media.

These and other objects will more fully appear as the description of the method proceeds.

As an example of the improved method of making dextran by this invention, the following is given:

EXAMPLE I 50 grams of waste sugar-refining charcoal are placed in a Soxhlet extraction thimble. Approximately 200 cc. of water are introduced into the Soxhlet apparatus and the extraction process is started and continued for from ten to twelve hours. Thereafter, this solution is filtered through coarse filter paper or glass fiber and evaporated on a steam bath to a volume of 35 or 40 cc. This volume is then made up to 150 cc. by adding water and the mixture filtered again to remove particles which may be present from the first filtration or have been precipitated during evaporation on the steam bath. The resulting filtrate is then adjusted to approximately pH 7 by the addition of hydrochloric acid or sodium hydroxide, depending on whether the reaction is acid or basic. The resulting solution then is sterilized in an autoclave at fifteen pounds pressure for approximately fifteen minutes. The filtrate contains a considerable quantity of the dextran synthesis factor and is incorporated with the culture medium to be used in the production of dextran. Good results are obtained when 1 cc. of the charcoal extract is added to each 100 cc. of culture medium.

In formulating the culture medium for the production of dextran, the following composition is used:

EXAMPLE II

| | | |
|---|---|---|
| Refined sucrose | grams | 10 to 15 |
| Peptone | do | 0.1 |
| Dipotassium phosphate | do | 0.1 |
| Sodium chloride | do | 0.1 |
| Water added in amount sufficient to make | cc | 100 |

To the above 100 cc. of culture medium is added 1 cc. of the charcoal extract of Example I. The resulting medium after sterilization is inoculated with bacteria of the Leuconostoc mesenteroides species and incubated at room temperature for two or three days to produce dextran. It is understood, of course, that larger or smaller quantities of the culture medium may be prepared by proportionately increasing or decreasing the amounts of the ingredients.

During incubation of the culture medium the reaction culture medium, if desired, may be kept slightly alkaline. This can be accomplished by adding alkali solution from time to time or by using an excess of calcium carbonate in the medium. After inoculation, the culture medium is incubated at the temperature most favorable to the growth of Leuconostoc mesenteroides and this temperature has been found to be most favorable at approximately 25° C. The progress of the fermentation may be followed by periodically removing samples of the fermenting culture medium and precipitating the dextran therefrom for assay purposes.

The precipitation of dextran

The culture medium as prepared above after a maximum fermentation has been effected, is preferably evaporated on a steam bath to decrease the water contained if desired or it may be used directly without further evaporation. This culture medium is added to ethanol, methanol, or acetone in the ratio of about one volume of culture to five volumes of precipitant. During the addition, the mixture is stirred vigorously. The preferred procedure is to introduce the culture medium in a fine stream under pressure into the vigorously stirred alcohol or acetone or similar agent which is used to precipitate the dextran from the culture medium.

In this way, there results an intimate admixture of the culture medium and the precipitating agent with a flocculation of dextran in the form of fine granular particles. Several hours are allowed for the particles to settle out, after which the precipitant is decanted or siphoned from the dextran. Sufficient ethanol (95%) is added to cover the precipitated dextran and the contents are allowed to stand for a few hours.

Extensive dehydration is essential in order to obtain a brittle, granular dextran product which can be readily pulverized and used for benzylation or similar subsequent processes. Ethanol accomplishes the dehydration very satisfactorily and, if desired, a second or third treatment with 95% ethanol may be made in order to produce a final dextran product which is substantially white and free from impurities.

This improved method, it will be understood, is not to be limited to the specific details and examples given but may be varied to suit different conditions and uses, so long as a substantially white, pulverizable dextran product is produced.

Further, it will be understood that it is desired to comprehend within this invention such modifications as come within the scope of the claim as appended hereto.

Having thus fully described my invention, what I claim as new and desire to secure by Letters Patent is:

An improved method of producing dextran comprising adding one part of a filtrate obtained by adjusting to a pH of about 7 a water extract of waste sugar-refining charcoal to about 100 parts of culture medium containing sucrose and fermenting this medium with bacteria of the *Leuconostoc mesenteroides* species.

GRANT L. STAHLY.